Aug. 8, 1961  C. K. SHARP  2,995,031
STEAM, AIR AND GAS CYLINDER LUBRICANT QUANTITATIVE
AND PERFORMANCE INDICATOR
Filed Jan. 13, 1959
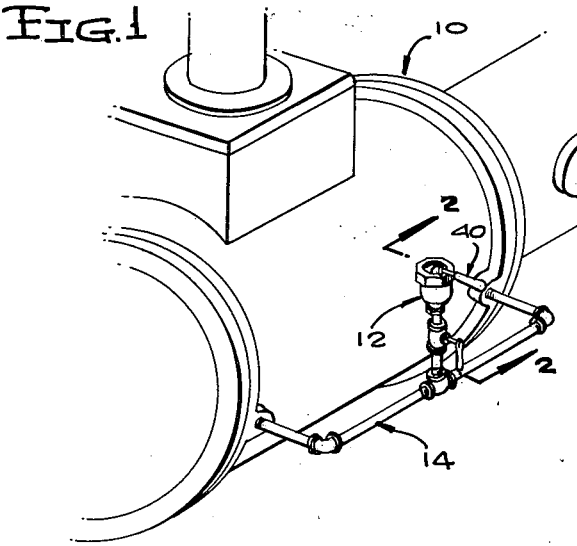
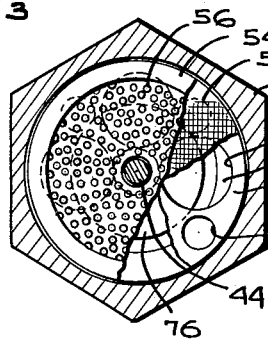
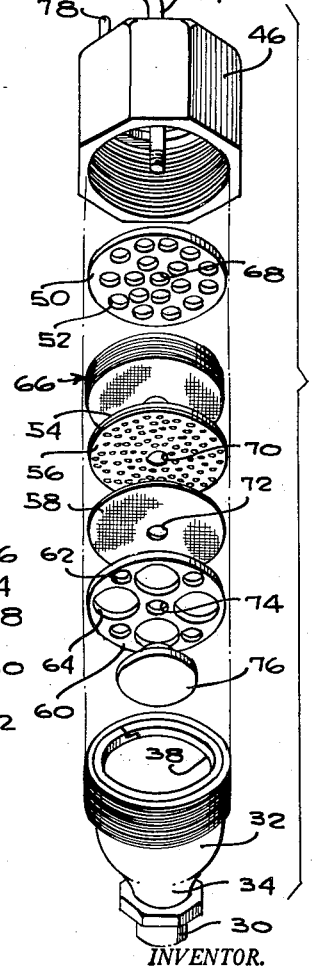
INVENTOR.
CAMPBELL K. SHARP
BY
McMorrow, Berman & Davidson
ATTORNEYS United States Patent Office 2,995,031
Patented Aug. 8, 1961

2,995,031
STEAM, AIR AND GAS CYLINDER LUBRICANT QUANTITATIVE AND PERFORMANCE INDICATOR
Campbell K. Sharp, Memphis, Tenn., assignor to Sharvania Oil & Grease Corp., Memphis, Tenn., a corporation of Tennessee
Filed Jan. 13, 1959, Ser. No. 786,597
4 Claims. (Cl. 73—64)

This invention relates to the provision of means for determining the internal lubrication condition of steam engines, air and/or gas compressor cylinders and for ascertaining the existence of abnormal wear therein in the event the same is present.

One of the primary objects of this invention is to provide an indicator device of the type generally referred to above which may be quickly and easily connected with or detached from a test cylinder to ascertain if proper oil lubrication is being maintained within the cylinder without making an engine shut-down and pulling the piston heads for visual inspection thereof, the usual costly procedure presently employed in making similar determinations.

Another important object of this invention is to provide means of the type described supra which may be installed on the test cylinder while the same is in operation.

The efficient and economical lubrication of steam engine driven compressors and circulators is very difficult to achieve under present operating conditions, and in order to play safe, there is a tendency on the part of the operating engineers to over lubricate the insides of cylinders to such an extent that the overabundance of oil soaks and penetrates out through all connections, the valve stems, rods and such, to run down the exterior surfaces in gobs, thus resulting in pure waste of the lubricant and excessive oil costs.

For the most part, operating engineers freely accept the responsibility for such waste feeding of lubricants, but point out that due to the fact that the interior cylinders cannot be seen in operation, the only manner in which adequate lubrication could be determined was to feed the oil to the cylinder until the same showed up externally. To advise the operating personnel of any plan to reduce the oil feeds blindly might result in a reduction of the lubricant to such an extent that excessive damage would occur to the cylinder walls, rings and valves for lack of lubrication, this of course necessitating shut-downs that quickly total up many thousands of dollars in costs, repairs and lost production.

Heretofore, the operating engineer has had to rely, substantially, upon the sound and feel of the cylinder while in operation, and to determine the internal operating conditions of the cylinder chiefly from intuition. This, naturally, results in wasteful over-feedings, giving rise to excessive oil costs and, in some circumstances wherein the operating engineer has been overly ambitious to reduce the oil costs the end result has led to costly cylinder reboring and/or ring replacement jobs.

Thus, a still further object of this invention is to provide positive indicating means which are adapted to be connected with a test cylinder to ascertain if the same is being over or under lubricated, the indicating means rendering it unnecessary for the engineer to engage in guess work or to rely upon intuition or experience in determining the actual lubricating conditions of the test cylinder.

This invention contemplates, as still another object thereof, the provision of means incorporated with the above referred to indicator means for determining if excessive wear is occurring during the operation of the test cylinder.

It is within the purview of this invention to provide means of the type generally set forth above which is non-complex in construction and assembly, inexpensive to manufacture and assemble, and durable in use.

Other and further objects and advantages of the instant invention will become more evident from a consideration of the following specification when read in conjunction with the annexed drawing, in which:

FIGURE 1 is a perspective view of a steam cylinder having connected thereto a lubricant quantitative and performance indicator constructed in accordance with the present invention;

FIGURE 2 is a vertical medial transverse cross-sectional view of the lubricant quantitative and performance indicator illustrated in FIGURE 1, FIGURE 2 being taken on the vertical plane of line 2—2 of FIGURE 1, looking in the direction of the arrows;

FIGURE 3 is a detail cross-sectional view taken substantially on the horizontal plane of line 3—3 of FIGURE 2, looking in the direction of the arrows; and, FIGURE 4 is an exploded perspective view of the cylinder lubricant quantitative and performance indicator shown in FIGURE 1.

Referring now more specifically to the drawing, reference numeral 10 designates, in general, a conventional steam engine cylinder equipped with the cylinder lubricant quantitative and performance indicator 12 constructed in accordance with the teachings of this invention. As in most steam cylinders, suitable piping 14 connect the opposed ends of the cylinder 10 with an engine indicator through a conventional manually operable valve 16, the engine indicator, which is attached once in a great while for valve setting purposes, in this instance having been removed to permit connection of the cylinder lubricant quantitative and performance indicator 12 in place thereof.

As is seen in the drawing, the piping 14 includes a centrally located vertical pipe length 18 on the upper end of which is threaded the lower end of a valve casing 20 having a bore 22 adapted to be placed in open communication with the upper terminal end of the pipe 18. A valve element 24 having a passage 26 extending diametrically therethrough is mounted for rotation in the casing 20, the passage 26 being adapted for rotation into and out of alignment with the bore 22 by means of a handle member 28.

To the upper end of the casing 20 is threadedly connected one end of a length of pipe 30 on which, at the other end thereof, is threaded a vertically elongated substantially hollow cylindrical body 32 having a pair of opposed ends of which one end 34 is necked down for connection with the pipe 30.

The other open end of the body 32 is counterbored to provide a shoulder 36 which loosely receives a split ring 38 therein, the ring 38 serving a purpose to be described.

Reference numeral 40 denotes, in general, an L-shaped handle having an elongated shank 42 which terminates in an off-set foot portion 44, the latter extending through an open end of the cap 46 threadedly connected on the aforementioned other end of the body 32. As is seen in FIGURE 2 of the drawing, the open end of the cap 46 is formed with an inwardly extending circumferential flange 48 against which seats a top holding plate 50 having a plurality of transversely extending openings 52 extending therethrough and being of substantially uniform diameter. Against the plate 50 abuts an annular spacer member 54 fixedly secured to the circumferential marginal edge of a wire mesh separator plate 56 against which is juxtaposed a circular disk 58 comprising a filter formed of, as for example, broadcloth of the type generally used in the manufacture of shirts. The areas of the plate 56 and of the filter disk 58 are co-extensive relative to each other.

As is seen in FIGURE 2, a plurality of series of the spacer elements 54, wire mesh separator plates 56 and filter disks 58 are arranged in descending order in the cap 46, and that the lowermost one of the series includes a bottom holding plate 60 which is substituted in lieu of a final spacer member 54 and separtor plate 56, the bottom holding plate 60 having a plurality of geometrically arranged transversely extending apertures 62, 64 formed therein of which the apertures 64 have a larger diameter than the diameter of the aperture 62. For convenience, the plurality of series of spacer members, separator plates 56 and filter disks 58 are illustrated as a unit at 66 in FIGURE 4.

The top holding plate 52, the separator plate 56, the filter disk 58 and the bottom holding plate 60 are all formed with centrally aligned openings 68, 70, 72 and 74 to permit the same to be slidably mounted on the foot portion 44 of the L-shaped handle 40. In the assembly shown in FIGURE 2, the unit 66 and the top and bottom holding plates are clamped between the flange 48 and the upper end of the body 32 with the foot portion 44 co-axially aligned with the pipe length or nipple 30, and to the free end of the foot portion 44 is threadedly secured a permanent magnet 76, the function of which is to be described below.

The flanged end of the cap 46 is provided with an abutment stud 78 fixedly secured thereto and disposed in the swinging path of movement of the shank 42 of the handle 40 in either its clockwise or counterclockwise direction, and the outer terminal end of the latter is preferably provided with a manual grip portion 80 formed of a heat insulating material.

The top holding plate 52, the spacer members 54, the separator plates 56 and the bottom holding plate 60 are all formed of stainless steel plate, and the filter disks 58 may be, if preferred, pasted or otherwise secured to the separator plates 56.

As has been previously set forth, no positive means have been heretofore devised for determining if a compression cylinder such as, for example, the steam cylinder 10 is being over or under lubricated or if undue or abnormal wear is occurring therein without shutting down the engine thereby giving rise to increased operating expenses. Consequently, it is an important object of this invention to provide positive means for ascertaining the internal condition of such cylinders while the same are operating under normal working conditions.

To illustrate the utility of the present invention, let it be assumed that the indicator 12 has been assembled and connected to the cylinder 10 in the manner described above. The valve element 24 is now turned to its open position (see FIGURE 2) to allow steam to pass out of cylinder 10 through the piping 14, the valve 16, the nipple 30 and into the body 32 of the indicator 12. The steam, together with the lubricating oil entrained therewith is under pressure and is exhausted through the bottom holding plate 60, the unit 66 and the top holding plate 52 to the ambient atmosphere. The valve element 24 is held in its open position for a given period of time (usually measured in seconds) after which it is rotated 90 degrees to its closed position. The operator now grasps the handle grip portion 80 and rotates the L-shaped handle 40 in a counterclockwise direction until the shank 42 engages and exerts pressure against the abutment stud 78 to effect a similar rotation of the cap 46 until the same is detached from the body 32.

The engineer on this test run may find that lubricating oil, under these conditions and entrained with the exhausted steam may have penetrated, for example, four or more of the filter disks 58, and an examination of the magnet 76 fails to disclose the adherence of metallic cuttings or particles thereon. Under these conditions it may be safely presumed that the cylinder 10 is being over-lubricated and uneconomically operated.

The indicator 12 is now re-assembled with a new unit 66 and the test engineer now reduces the oil feed to the cylinder during successive runs until the magnet 76 shows a very slight accumulation of cuttings or particles thereon evidencing that the cylinder 10 is being under-lubricated. At this time, the unit 66 is again replaced and the oil feed is gradually increased in succeeding incerments until inspection of the magnet 76 reveals no metal adherence or accumulation thereon, and thereafter the engineer, from the number of filter disks 58 through which the oil has passed or penetrated and records the same for future reference. Under these conditions all internal wear inside the cylinder has been obviated and the optimum in lubricating efficiency has been obtained.

Throughout all of the above tests, the same number of filter disks 58 are maintained in the unit 66 to preserve a constant norm whereby subsequent comparison tests may be made against a known standard at desired intervals of time to ascertain the internal condition of the cylinder.

A third important object of this invention in connection with the determination of the internal condition of the cylinder resides in the provision of the split or piston ring 38. In the usual practice, piston rings are mounted in grooves cut around pistons traversing the cylinder walls when in operation. These rings fit into the grooves with very close tolerances and deposits sometimes form in these grooves in sufficient amounts to lock the rings therein and effect a disruption of the operation of the cylinder, its operating efficiency, etc. In the case of steam engines the same is caused by high boiler concentration, minerals dirt and foreign matter carrying over in the steam and finding its way into the clearance spaces between the piston rings and their respective grooves, especially in the back of the rings, where it is held to the hot metal surfaces by the cylinder oil being used. This oil acts as a binder, and in time, the heat of the steam bakes the carry-over plus the oil clinging to it into such hard deposits that the rings sometimes have to be chiseled out. This, of course, involves costly shut-down periods of the engine. Therefore, the present invention utilizes the split or piston ring 38. This duplicate but miniature piston ring and groove assembly as compared against the piston and groove assembly of the engine per se, being exposed to the same steam source, provides means for detecting evidence of excessive carry-over, or foreign material in the steam and to give full evaluation thereof in order to take the necessary preventive or corrective steps to eliminate this cause of trouble at its source through the reduction of the steam entrained carry-over from the steam boilers.

Having described and illustrated one embodiment of this invention in detail, it will be understood that the same is offered merely by way of example, and that this invention is to be limited only by the scope of the appended claims.

What is claimed is:

1. A lubricant feed indicator for indicating over and under feeding of lubricant to a gas compressor cylinder comprising an elongated substantially hollow body having a pair of opposed open ends, means for connecting one of said ends with said cylinder, a cap having a pair of opposed open ends, means detachably connecting one of said open ends of said cap with the other of said open ends of said body, the other open end of said cap venitng to the atmosphere, said cap having an inwardly extending circumferential flange adjacent the other open end thereof, a plurality of fabric filter disks disposed in spaced confronting relation relative to each other, said disks taken as a whole comprising a filter unit, said unit being disposed within said cap and clamped between said flange and said other end of said body, a permanent magnet disposed within said body proximate said one of its ends, and means extending through said unit for supporting said magnet within said cap.

2. A lubricant feed indicator for indicating over and under feeding of lubricant to a gas compressor cylinder as defined in claim 1, wherein said unit comprises top and bottom holding plates each having a plurality of openings extending transversely therethrough and between which is disposed in sequential order a plurality of spacer elements, wire mesh screens and fabric filter members, said spacer members being fixedly secured to the marginal edge of one of said screens immediately adjacent thereto and on one side of the latter, and each of said filter members being detachably secured to the marginal edge of said screen immediately adjacent the other side thereof.

3. A lubricant feed indicator for indicating over and under feeding of lubricant to a gas compressor cylinder as defined in claim 2, wherein said spacer elements are annular in configuration and said screens and filters are substantially circular in configuration.

4. A lubricant feed indicator for indicating over and under feeding of lubricant to a steam engine, air and/or gas compressor cylinder as defined in claim 3, wherein said means for supporting said magnet comprise an L-shaped handle member having a foot portion rotatably supported in said unit and the shank portion thereof extending radially beyond said flanged end of said cap, and an abutment stud secured to said flanged end of said cap and disposed in the path of movement of said shank for engagement therewith to effect connection and/or disconnection of said cap from said body corresponding to the direction of a force exerted on said shank.

References Cited in the file of this patent

UNITED STATES PATENTS

| | | |
|---|---|---|
| 700,683 | Goetze | May 20, 1902 |
| 1,102,685 | Proper | July 7, 1914 |
| 2,760,637 | Franch | Aug. 28, 1956 |